United States Patent [19]

Leo

[11] Patent Number: 5,087,473
[45] Date of Patent: Feb. 11, 1992

[54] FOOD PRODUCT FOR DOMESTIC ANIMALS AND A METHOD FOR ITS MANUFACTURE

[76] Inventor: Franca Leo, Corso Francia 35, 10138 Torino, Italy

[21] Appl. No.: 594,910

[22] Filed: Oct. 5, 1990

[30] Foreign Application Priority Data

Oct. 6, 1989 [IT] Italy .................. 67855 A/89
Oct. 31, 1989 [IT] Italy .................. 67930 A/89

[51] Int. Cl.⁵ .................................................. A23K 1/00
[52] U.S. Cl. ........................................ 426/646; 426/72; 426/74; 426/385; 426/512; 426/623; 426/805
[58] Field of Search ............... 426/805, 646, 384, 807, 426/623, 630, 385, 72, 74, 512

[56] References Cited

U.S. PATENT DOCUMENTS

| | | |
|---|---|---|
| H35 | 3/1986 | Berkowitz .................. 426/646 |
| Re. 18,048 | 4/1931 | Hansen ...................... 426/646 |
| 201,878 | 4/1878 | Grivel ........................ 426/646 |
| 1,979,124 | 6/1935 | Tival ......................... 426/385 |
| 2,138,177 | 11/1938 | Kruger et al. ............. 426/646 |
| 2,168,138 | 8/1939 | Sakurai ..................... 426/646 |
| 2,440,168 | 8/1948 | Cross ........................ 426/646 |
| 2,447,427 | 7/1948 | Oftedahl ................... 426/646 |
| 2,503,282 | 4/1950 | Lynne ....................... 426/646 |
| 3,361,566 | 1/1968 | Axelrod ..................... 426/385 |

OTHER PUBLICATIONS

Young, "Vacuum and Gas Packages" Packaging Reference Issue 1986, pp. 160–163.

*Primary Examiner*—R. B. Penland
*Attorney, Agent, or Firm*—Sughrue, Mion, Zinn, Macpeak & Seas

[57] ABSTRACT

A food product for dogs and cats consists of a paste of meat, vegtables, eggs, mineral salts, maize flour, soya lecithin, milk or its derivatives, which is subsequently moulded to a desired shape. The product thus shaped is then freeze dried.

7 Claims, No Drawings

FOOD PRODUCT FOR DOMESTIC ANIMALS AND A METHOD FOR ITS MANUFACTURE

The present invention relates to a food product for domestic animals.

The object of the invention is to provide a food product for domestic animals which is immediately ready for consumption.

This object is achieved by virtue of the fact that the food product comprises the following components:

| Components | % by weight |
| --- | --- |
| Meat | 65-85 |
| Vegetables | 4-12 |
| Eggs | 3.5-11 |
| Mineral salts | 0.2-2 |
| Maize flour | 2-8 |
| Soya lecithin | 1-6 |
| Milk or its derivatives | 1-8 |

These components are preferably mixed together so as to form a cake or titbit.

The mineral salts preferably comprise salts of phosphorus, calcium, zinc and manganese. The meat is preferably selected from chicken, beef, rabbit, turkey and fish and offal may be used to advantage.

Of the vegetables, those particularly preferred are carrots, spinach, peas, lentils, beets and catmint.

0.1 to 10% of olive pulp and 0.1 to 10% of yeast are preferably added to the composition.

The composition mentioned above is particularly useful as cat food. For dogs the composition is essentially the same but with the addition of a variable percentage of fruit (apricots-apples-pears-peaches-bilberry-grapes).

The composition of the invention may be used in the form of a freeze dried powder as a food supplement for domestic animals.

Its use as a food supplement is particularly indicated for puppies which are not attracted by certain foods although they are necessary for their weaning. In this case, it suffices to sprinkle the food with the freeze-dried, powdered composition of the invention so that the animal is strongly attracted to it in that the delicate flavour is enhanced. The flavouring effect of the food supplement may also be used to advantage for animals which have lost their appetite or are convalescent and normally refuse the necessary medicines; if the medicine is sprinkled with a small amount of the powder the animal is strongly attracted to it.

The food compositions of the invention may also be used for animals which are suckling and for animals without teeth which may be provided with small doses of the product instead of the daily food intake by the simple addition of water, milk or broth to make it into a cream. The supplement may also be packaged directly in milk, in rice flour, in cheese, in various forms of yoghurt and in potatoes for feeding to domestic animals.

For dogs, the addition of olive pulp is not essential and may be replaced by the addition of a variable percentage of fruit such as apricots, apples, pears, peaches, grapes etc.

The composition according to the invention may comprise to advantage also magnesium salts and vitamin B6.

The freeze-dried product according to the invention has a very low humidity, which may vary from 1.3 to 2.7% by weight. The analysis of the dried substance pointed out the following average composition:

| | % by weight |
| --- | --- |
| raw proteins | 45-77 |
| raw lipids | 10-40 |
| raw fibre | 0.2-0.8 |
| ash | 3.5-6 |
| not-nitrogenous extract | 6.7-12 |

A further subject of the invention is a method for the production of the said product. This method includes the step of mixing the components listed above into a paste or dough, modelling the paste to a desired shape in a mould, freeze drying and packaging it in a gas-impermeable wrapper.

This method enables the freeze-dried product, if formed into a cake, to re-absorb the necessary moisture simply by immersion in water, milk or broth. Moreover, whenever the product is granulated or powdered or is shaped into a cake, titbit or bar, it may be fed directly to the domestic animal.

Further advantages and characteristics of the product and of the method of the invention will become apparent from the following example which must not be understood as limiting the scope of the present invention.

EXAMPLE

In order to obtain a cat food, the following quantities of ingredients are mixed into a paste:

meat-132 g; vegetables-11 g; eggs-9 g; olive pulp-3 g; salts of phosphorus-0.5 g; salts of calcium-0.6 g; salts of zinc-2.5 mg; salts of manganese-0.25 mg.

Maize flour, soya lecithin and milk are then added in the quantities necessary to form a paste of a suitable consistency. The paste is subsequently pressed into a cake-shaped mould. The cake thus formed is introduced into a freeze-drying plant of known type in order to reduce the moisture content to values of approximately 1%. At the outlet from the freeze-drying plant, the product is packaged in a gas-impermeable envelope.

In use of the product, it suffices to immerse the cake in water, milk or broth for a few moments and to feed it, for example in slices, to the domestic animal.

We claim:

1. A food product for domestic animals consisting essentially of the following components:

| Components | % by weight |
| --- | --- |
| Meat | 65-85 |
| Vegetables | 4-12 |
| Eggs | 3.5-11 |
| Mineral salts | 0.2-2 |
| Maize flour | 2-8 |
| Soya lecithin | 1-6 |
| Milk | 1-8 | wherein said food product is freeze dried.

2. A food product according to claim 1, further consisting essentially of from 0.1 to 10% by weight of olive pulp.

3. A food product according to claim 2, wherein the olive pulp content is in the range 0.5 to 5% by weight.

4. A food product according to claim 1, further consisting essentially of from 0.1 to 10% by weight of yeast.

5. A food product according to claim 1, further consisting essentially of from 0.1 to 10% of freeze-dried powdered fruit.

6. A food product according to claim 1 further consisting essentially of magnesium salts and vitamin B6.

7. A method for the manufacture of a food product for domestic animals consisting essentially of the following steps:
  forming a mixture of components into a paste, the components comprising from 65 to 85% by weight of meat, from 4 to 12% of vegetables, from 3.5 to 11%. of egg, from 0.2 to 2% of mineral salts, from 2 to 8% of maize flour, from 1 to 6% of soya lecithin, from 1 to 8% of milk, modelling the paste to a desired shape in a mould, freeze drying the product, and packaging said product in a gas-impermeable wrapper.

* * * * *